Sept. 9, 1952

J. D. REID 2,610,248

RADIO FREQUENCY COUPLING CIRCUIT

Filed Jan. 3, 1949

INVENTOR.
JOHN D REID.
BY
Alden D. Redfield,
Charles M. Hogan ATTYS

Patented Sept. 9, 1952 2,610,248

UNITED STATES PATENT OFFICE 2,610,248

RADIO FREQUENCY COUPLING CIRCUIT

John Drysdale Reid, Cincinnati, Ohio, assignor to Avco Manufacturing Corporation, Cincinnati, Ohio, a corporation of Delaware Application January 3, 1949, Serial No. 69,020

1 Claim. (Cl. 178—44)

Figure 1:
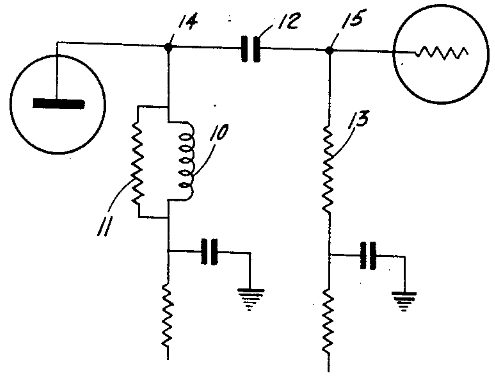

The present invention relates to radio frequency coupling circuits and specifically to a novel VHF interstage coupling circuit and process for simultaneously making the principal components thereof.

A typical single-tuned interstage coupling circuit of the type frequently used in staggered-tuned video I. F. amplifier systems comprises an inductor 10 shunted by its own distributed capacitance and a loading resistor 11 (Fig. 1) and connected to the anode of the tube of one stage, a coupling capacitor 12, and a grid resistor 13 connected to the grid of the tube included in the following stage. This circuit requires a coupling capacitor, a connection 14 between one terminal of the coupling capacitor and one terminal of the inductor, and a connection 15 between the other terminal of the coupling capacitor and the grid resistor. The present invention provides a circuit which is the electric equivalent of this interstage coupling circuit, dispenses with the coupling capacitor and the two connections such as those denominated 14 and 15 in Fig. 1 and permits full utilization of existing component leads for making connections to the anode of the first stage and the control electrode of the succeeding stage.

The invention also provides a process whereby the principal components of this electric equivalent circuit may be produced in one simple operation, with the following resultant advantages: first, the manufacturing costs of two connections and soldering operations are avoided; second, non-uniformities are avoided; third, the coupling capacitor is omitted.

It is a primary object of the present invention to provide in one stamping operation the principal components of a single-tuned wide band VHF interstage coupling network.

Another object of the invention is to provide an equivalent to the aforementioned prior art circuit in which the coupling capacitor is omitted.

For a better understanding of the present invention, together with other and further objects, advantages, and capabilities thereof, reference is made to the following description of the accompanying drawings, in which there is illustrated a preferred form of very high frequency interstage coupling circuit in accordance with the invention.

Figure 3:
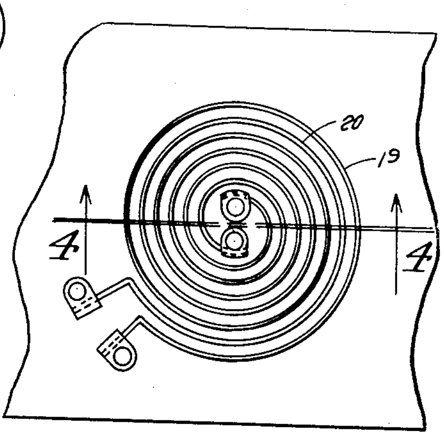
Figure 2:
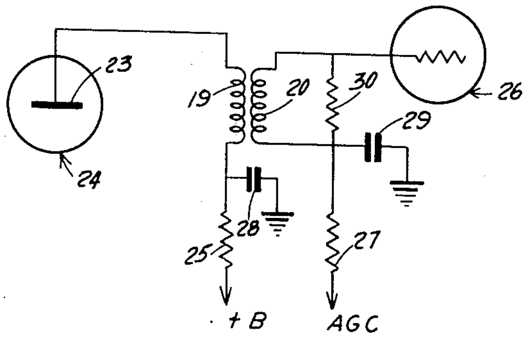
Figure 5:
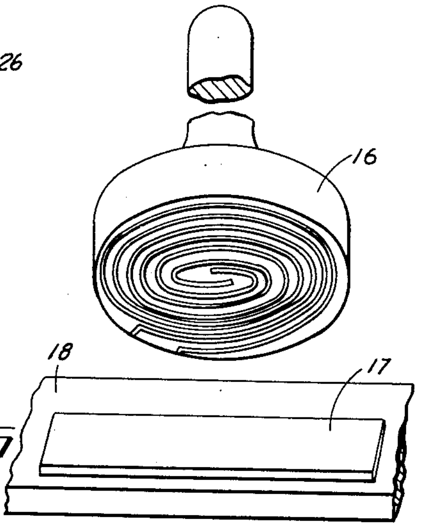
Figure 4:
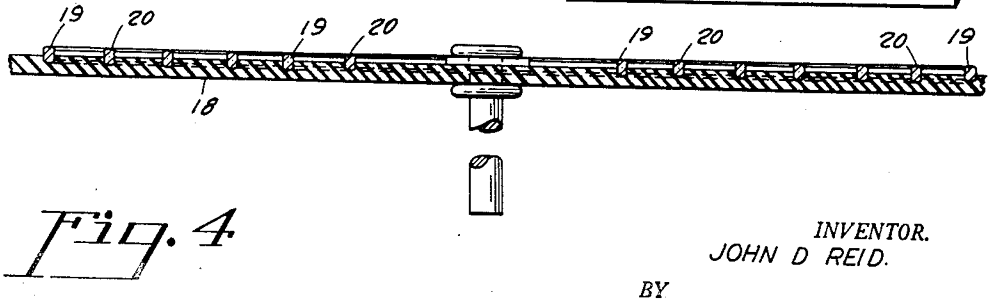

In the drawings:

Fig. 1 is a circuit schematic of a typical single-tuned wide band VHF interstage coupling network in accordance with the prior art; Fig. 2 is a schematic circuit diagram of the electric equivalent which is provided in accordance with the invention by more simple and economical components and processes; Figs. 3 and 4 are plan and sectional views of a stamped-out transformer unit provided in accordance with the invention, and Fig. 5 is a view showing how the transformer conductors are stamped out.

The invention contemplates the stamping out by a die 16, acting on a blank piece of conductive material 17, superimposed on a dielectric base 18, of a pair of interleaved concentric spirals 19 and 20. These spirals are deeply imbedded into the base, the latter being made of any suitable low loss dielectric material. So far as I am aware, no one has heretofore conceived the idea of stamping both primary and secondary of a transformer, in one operation, on the same side of a base. In accordance with another specific form of the invention, the spirals may be sprayed, silk-screened, printed or otherwise deposited on the base, which may be grooved in advance to receive the metallic material.

The stamped transformer just described comprises the principal components of a novel VHF interstage coupling network also provided in accordance with the invention. This network contemplates that the leads of the primary 19 be connected to the anode 23 of the tube 24 of one stage and to a plate dropping resistor 25. The leads of the secondary 20 are connected to the grid of the tube 26 of the succeeding stage and to an automatic gain control resistor 27. Plate and grid by-pass capacitors 28 and 29 are connected in conventional fashion.

The two spirals 19 and 20 are extremely closely coupled, approaching unity coupling, so that they effectively act as a single-tuned circuit but at the same time provide coupling means which eliminates the coupling condenser 12 of the prior art. Further, the single resistor 30, shunted across the secondary 20, performs the same functions as the resistors 11 and 13 of the prior art circuit. Therefore the Fig. 2 circuit has the further advantage and economy that an additional resistor is dispensed with.

The Fig. 2 circuit, embodying the Fig. 3 transformer, has the outstanding commercial advantage that its principal components may be stamped out in one operation, and it is therefore anticipated that this construction will meet with wide-spread commercial acceptance, particularly in VHF interstage coupling networks for television receivers.

While there has been shown and described what is at present considered to be the preferred embodiment of the invention, it will be obvious to those skilled in the art that various modifications and substitutions of equivalents may be made therein without departing from the invention as defined by the appended claim.

Having fully disclosed and described my invention, I claim:

In a television receiver intermediate frequency amplifier, the combination of a plurality of stages, each of which includes an electron tube having a control electrode, and a coupling network comprising a transformer consisting of a pair of closely spaced interleaved concentric conductive spirals, one of which is coupled as a primary to the output of a stage and the other of which is coupled as a secondary to the control electrode of a succeeding stage, said spirals being intimately capacitively and inductively coupled together and tuned by their distributed capacitance to provide a response characteristic with widely spaced peaks, and a single grid resistor in shunt with said other spiral, said resistor providing the sole damping for both said primary and said secondary to widen the frequency band of said network, said resistor also unbalancing the Q's of said primary and secondary to render one peak servient and the other peak so dominant that the response characteristic is non-symmetrical and that the dominant peak may be employed to provide a satisfactory pass band.

JOHN DRYSDALE REID.

REFERENCES CITED

The following references are of record in the file of this patent:

UNITED STATES PATENTS

| Number | Name | Date |
|---|---|---|
| 1,791,236 | Drake | Feb. 3, 1931 |
| 2,131,193 | Schlesinger | Sept. 27, 1938 |
| 2,270,539 | Malling | Jan. 20, 1942 |
| 2,276,482 | Grundmann | Mar. 17, 1942 |
| 2,397,850 | Ford | Apr. 2, 1946 |
| 2,401,472 | Franklin | June 4, 1946 |
| 2,441,960 | Eisler | May 25, 1948 |
| 2,474,988 | Sargrove | July 5, 1949 |